(12) United States Patent
Isono et al.

(10) Patent No.: US 11,876,173 B2
(45) Date of Patent: Jan. 16, 2024

(54) ALL-SOLID-STATE BATTERY, METHOD OF PRODUCING BATTERY ELEMENT, AND METHOD OF PRODUCING ALL-SOLID-STATE BATTERY

(71) Applicant: Toyota Jidosha Kabushiki Kaisha, Toyota (JP)

(72) Inventors: Motoshi Isono, Toyota (JP); Masato Ono, Nagoya (JP); Keiichi Minami, Shizuoka-ken (JP); Kazuhito Kato, Nagoya (JP); Katsuaki Odagi, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 17/202,918

(22) Filed: Mar. 16, 2021

(65) Prior Publication Data
US 2021/0296689 A1    Sep. 23, 2021

(30) Foreign Application Priority Data

Mar. 18, 2020  (JP) ................................. 2020-047856

(51) Int. Cl.
*H01M 10/0525*    (2010.01)
*H01M 10/0562*    (2010.01)
(Continued)

(52) U.S. Cl.
CPC ....... *H01M 10/0562* (2013.01); *H01M 4/134* (2013.01); *H01M 10/0525* (2013.01);
(Continued)

(58) Field of Classification Search
CPC ....... H01M 10/0562; H01M 2004/028; H01M 2004/027; H01M 10/42; H01M 10/0585; H01M 10/0525; H01M 4/134
See application file for complete search history.

(56) References Cited

U.S. PATENT DOCUMENTS 7,927,736 B2 * 4/2011 Meitav ................ H01M 50/124
429/153
2006/0246350 A1 * 11/2006 Takayama ............ B60L 3/0046
429/178
(Continued)

FOREIGN PATENT DOCUMENTS

CN        104638310 A    5/2015
JP        2000-106154 A  4/2000
(Continued)

OTHER PUBLICATIONS

A Phenomenological Model of Bulk Force in a Li-Ion Battery Pack and Its Application to State of Charge Estimation (Year: 2014).*
(Continued)

*Primary Examiner* — Cynthia H Kelly
*Assistant Examiner* — Tarik J Phillip
(74) *Attorney, Agent, or Firm* — Dinsmore & Shohl LLP

(57) ABSTRACT

An all-solid-state battery includes a case, a battery element, and a restraint component. The case accommodates the battery element. The battery element includes an electrode part and a resin part. The resin part covers at least a part of a side face of the electrode part. The restraint component applies a first pressure to the electrode part. The restraint component applies a second pressure to the resin part. The ratio of the second pressure to the first pressure is from 1.5 to 18.

5 Claims, 9 Drawing Sheets

(51) Int. Cl.
*H01M 10/0585* (2010.01)
*H01M 10/42* (2006.01)
*H01M 4/134* (2010.01)
*H01M 4/02* (2006.01)

(52) U.S. Cl.
CPC ....... *H01M 10/0585* (2013.01); *H01M 10/42* (2013.01); *H01M 2004/027* (2013.01); *H01M 2004/028* (2013.01)

(56) References Cited

U.S. PATENT DOCUMENTS

| | | |
|---|---|---|
| 2009/0233164 A1 | 9/2009 | Shimamura et al. |
| 2015/0134172 A1 | 5/2015 | Ose et al. |
| 2018/0233711 A1 | 8/2018 | Kato |
| 2019/0023954 A1* | 1/2019 | Kouka .................... B32B 27/32 |
| 2019/0280329 A1 | 9/2019 | Waseda |

FOREIGN PATENT DOCUMENTS

| | | | |
|---|---|---|---|
| JP | 2008-103288 A | | 5/2008 |
| JP | 2011142040 A | * | 7/2011 |
| JP | 2014089842 A | * | 5/2014 |
| JP | 2018-133175 A | | 8/2018 |
| JP | 2019-125455 A | | 7/2019 |
| JP | 2019-153535 A | | 9/2019 |
| JP | 2019-197652 A | | 11/2019 |
| KR | 20070085876 A | | 8/2007 |

OTHER PUBLICATIONS

Modified translation of JP-2011142040-A Kohama (Year: 2011).*

Modified translation of JP-2014089842-A as taught by Tsujiko (Year: 2014).*

Mussa et al, Effects of external pressure on the performance and ageing of single-layer lithium-ion pouch cells (Year: 2018).*

* cited by examiner

ALL-SOLID-STATE BATTERY, METHOD OF PRODUCING BATTERY ELEMENT, AND METHOD OF PRODUCING ALL-SOLID-STATE BATTERY

CROSS REFERENCE TO RELATED APPLICATION

This nonprovisional application is based on Japanese Patent Application No. 2020-047856 filed on Mar. 18, 2020, with the Japan Patent Office, the entire contents of which are hereby incorporated by reference.

BACKGROUND

Field

The present disclosure relates to an all-solid-state battery, a method of producing a battery element, and a method of producing an all-solid-state battery.

Description of the Background Art

Japanese Patent Laying-Open No. 2019-153535 discloses a resin layer that covers a side face of an all-solid-state battery stacked body.

SUMMARY

All-solid-state batteries have been developed. An all-solid-state battery includes a case and a battery element. The case accommodates the battery element. The battery element includes an electrode part. The electrode part is formed by alternately stacking an electrode layer and a solid electrolyte layer.

For example, for securing the electrode part, a resin part may be formed on a side face of the electrode part. For example, a curable resin material and/or the like may be applied to a side face of the electrode part to form a resin part.

A battery element in an all-solid-state battery needs to be dense. When the battery element is dense, battery resistance may be reduced, for example. Hence, use of a restraint component may be considered, for example. The restraint component is disposed outside the case. The restraint component applies pressure to the battery element through the case. The pressure applied by the restraint component is also called "restraining pressure". The restraining pressure may crush gaps inside the battery element, rendering the battery element dense.

The battery element includes an electrode part and a resin part. The electrode part includes a ceramic material. The resin part includes a resin cured product. Due to the difference in the constituent materials, the rigidity of the resin part may be different from the rigidity of the electrode part. When the battery element is restrained, if pressure is not properly applied to the electrode part and to the resin part, deformation may occur disproportionately in the resin part to break it. Moreover, if pressure is not properly applied to the electrode part and to the resin part, deformation may occur disproportionately in the case to break it.

An object of the present disclosure is to reduce breaks in both a resin part and a case of an all-solid-state battery that includes a restraint component.

Hereinafter, the technical configuration and effects of the present disclosure will be described. It should be noted that the action mechanism according to the present disclosure includes presumption. The scope of claims should not be limited by whether or not the action mechanism is correct.

[1] An all-solid-state battery includes a case, a battery element, and a restraint component.

The case accommodates the battery element. The battery element includes an electrode part and a resin part.

The electrode part includes one or more stacked units. Each of the stacked units includes a positive electrode layer, a solid electrolyte layer, and a negative electrode layer. The electrode part has a first main face, a second main face, and a side face. The second main face is positioned opposite to the first main face. The side face connects the first main face and the second main face to each other. The positive electrode layer, the solid electrolyte layer, and the negative electrode layer are stacked in a direction from the first main face toward the second main face.

The resin part includes a resin cured product. The resin part covers at least a part of a side face of the electrode part.

The restraint component is mounted outside the case. The restraint component applies pressure to the battery element through application of pressure to both sides of the battery element in a direction from the first main face toward the second main face. The restraint component applies a first pressure to the electrode part. The restraint component applies a second pressure to the resin part. The ratio of the second pressure to the first pressure is from 1.5 to 18.

According to the present disclosure, a first pressure ($P_1$) is applied to the electrode part, and a second pressure ($P_2$) is applied to the resin part. The ratio of the second pressure to the first pressure ($P_2/P_1$) is from 1.5 to 18. Hereinafter, the ratio of the second pressure to the first pressure ($P_2/P_1$) is also called "pressure ratio ($P_2/P_1$)".

According to a novel finding of the present disclosure, when the pressure ratio ($P_2/P_1$) is lower than 1.5, the resin part tends to break, and when the pressure ratio ($P_2/P_1$) is higher than 18, the case tends to break. When the pressure ratio ($P_2/P_1$) is from 1.5 to 18, breaks in both the resin part and the case may be reduced.

[2] In the all-solid-state battery according to [1] above, the resin part may include, for example, at least one selected from the group consisting of a photocurable resin cured product and a thermocurable resin cured product.

[3] A method of producing a battery element comprises (a), (b), and (c) below:
(a) forming an electrode part including one or more stacked units;
(b) applying a curable resin material to the electrode part to form a resin part; and
(c) curing the curable resin material after the forming the resin part to produce a battery element.

The electrode part has a first main face, a second main face, and a side face. The second main face is positioned opposite to the first main face. The side face connects the first main face and the second main face to each other. A positive electrode layer, a solid electrolyte layer, and a negative electrode layer are stacked in a direction from the first main face toward the second main face.

The curable resin material is applied so as to cover at least a part of a side face of the electrode part.

Pressure is applied to the electrode part through application of pressure to both sides of the electrode part in a direction from the first main face toward the second main face while the curable resin material is being applied to the side face of the electrode part and cured.

In the configuration in which pressure is applied to the electrode part while the curable resin material is being applied and cured, the rigidity of the electrode part and the resin part may be changed. The pressure applied during application and curing ($P_0$) may be changed, and thereby the "pressure ratio ($P_2/P_1$)" during restraint may be adjusted. In other words, a battery element applicable to the all-solid-state battery according to [1] above may be produced.

Further, the pressure applied during application and curing ($P_0$) may render the electrode part dense. In other words, gaps between layers in the electrode part may be reduced. Accordingly, the resistance of the battery element may be reduced, for example. As long as the resistance of the battery element is low, an intended level of battery resistance may be achieved even when, for example, the restraining pressure is low.

[4] In the method of producing a battery element according to [3] above, the curable resin material may include, for example, at least one selected from the group consisting of a photocurable resin material and a thermocurable resin material.

[5] In the method of producing a battery element according to [3] or [4] above, the pressure applied to the electrode part may be from 0.03 MPa to 0.05 MPa, for example.

When the pressure applied during application and curing ($P_0$) is from 0.03 MPa to 0.05 MPa, a pressure ratio ($P_2/P_1$) during restraint from 1.5 to 18 may be achieved, for example.

[6] In the method of producing a battery element according to [3] or [4] above, the pressure applied to the electrode part may be from 0.05 MPa to 3 MPa, for example.

When the pressure applied during application and curing ($P_0$) is from 0.05 MPa to 3 MPa, the resistance of the battery element may be reduced, for example. This phenomenon may occur as a result of the electrode part being rendered dense.

[7] A method of producing an all-solid-state battery comprises (d) and (e) below, in addition to (a) to (c) above:
(d) accommodating the battery element in a case; and
(e) mounting a restraint component outside the case to produce an all-solid-state battery.

The battery element is produced by the method of producing a battery element according to [3] above.

The restraint component is mounted so as to apply pressure to the battery element through application of pressure to both sides of the battery element in a direction from the first main face toward the second main face.

By the method of producing an all-solid-state battery according to [7] above, the resistance of the battery element may be reduced. As a result, an intended level of battery resistance may be achieved even with, for example, a low restraining pressure.

[8] In the method of producing an all-solid-state battery according to [7] above, the restraint component applies a first pressure to the electrode part, and the restraint component applies a second pressure to the resin part. The ratio of the second pressure to the first pressure may be from 1.5 to 18, for example.

By the method of producing an all-solid-state battery according to [8] above, breaks in both the resin part and the case may be reduced.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Hereinafter, an embodiment of the present disclosure (also called "present embodiment" hereinafter) will be described. It should be noted that the description below does not limit the scope of claims.

In the present embodiment, any geometric term (such as "parallel", "vertical", "orthogonal", for example) should not be interpreted solely in its exact meaning. A geometric term used in the present embodiment also encompasses a geometric relationship that is substantially the same as the exact meaning of the term. For example, the term "parallel" may mean a geometric relationship that is deviated, to some extent, from exact parallel.

In the present embodiment, expressions such as "from 1.5 to 18" mean a range that includes both the boundary values, unless otherwise specified. For example, "from 1.5 to 18" means a range of "not lower than 1.5 and not higher than 18".

<All-Solid-State Battery>

An all-solid-state battery according to the present embodiment may be used in any application. The all-solid-state battery may be used for a driving power supply of an electric vehicle, for example. The all-solid-state battery may be used for a driving power supply of a hybrid vehicle, for example. The all-solid-state battery may be used for a power storage system for household use, for example.

Figure 1:
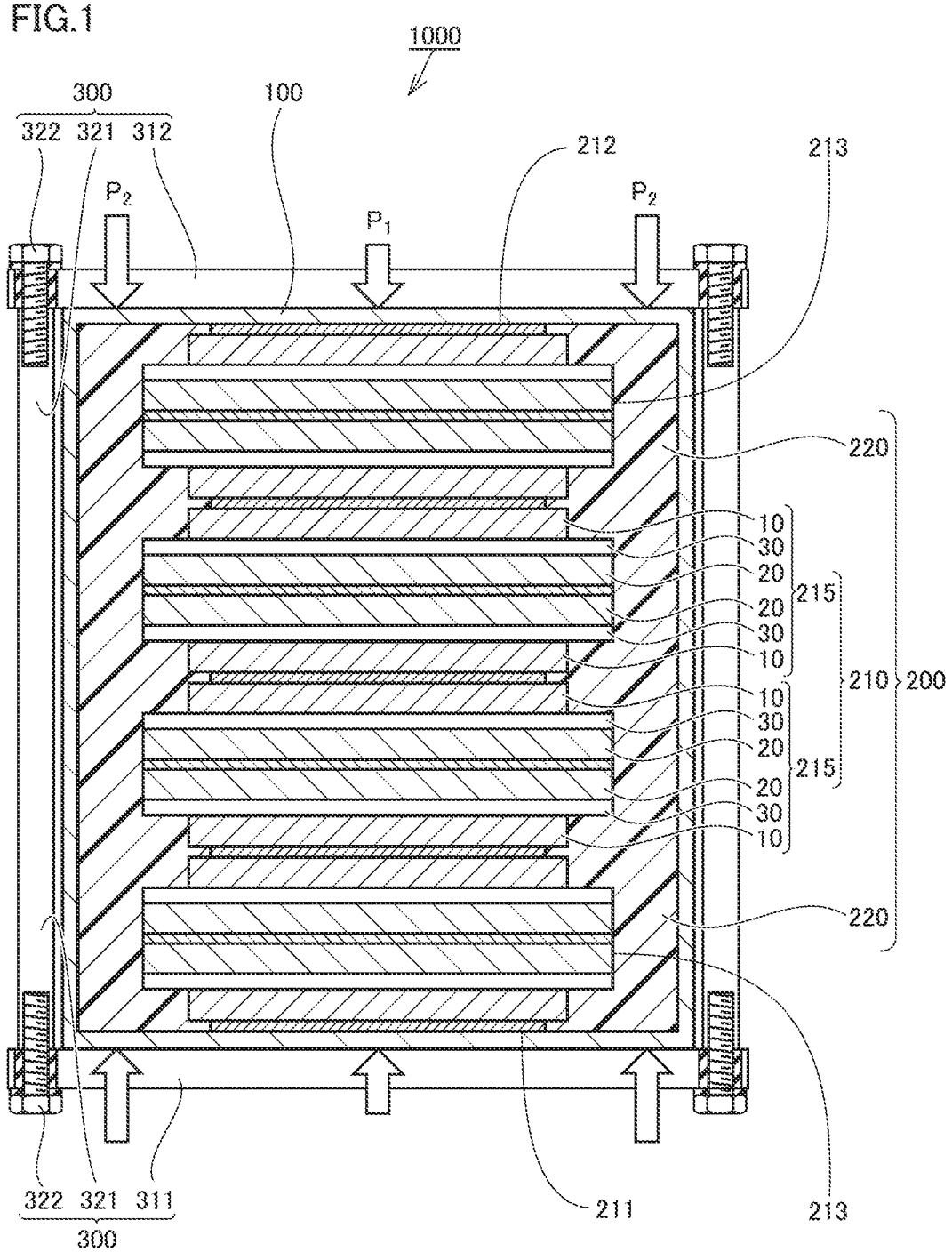
FIG. 1 is a schematic cross-sectional view illustrating an example of the all-solid-state battery according to the present embodiment.

FIG. 1 is a schematic cross-sectional view illustrating an example of the all-solid-state battery according to the present embodiment.

An all-solid-state battery 1000 includes a case 100, a battery element 200, and a restraint component 300. All-solid-state battery 1000 may further include an external terminal (not illustrated) and/or the like. For example, battery element 200 and the external terminal may be connected to each other via a lead plate (not illustrated) and/or the like.

<<Case>>

Case 100 accommodates battery element 200. Case 100 is hermetically sealed. Case 100 may include a metal-laminated film and/or the like, for example. Case 100 may be a pouch made of a metal-laminated film, for example.

Figure 2:
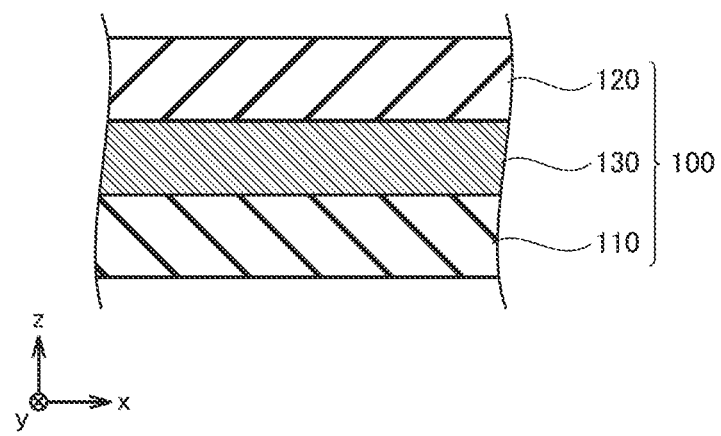
FIG. 2 is a schematic partial cross-sectional view illustrating an example of the case.

FIG. 2 is a schematic partial cross-sectional view illustrating an example of the case.

The metal-laminated film may have a three-layer structure, for example. More specifically, case 100 may include a first resin layer 110, a metal layer 130, and a second resin layer 120, for example. Metal layer 130 is interposed between first resin layer 110 and second resin layer 120. Metal layer 130 may have a thickness from 10 µm to 100 µm, for example. Metal layer 130 may include aluminum (Al) and/or the like, for example. Each of first resin layer 110 and second resin layer 120 may include, for example, at least one selected from the group consisting of polyethylene (PE), polyethylene terephthalate (PET), and polyamide (PA). Each of first resin layer 110 and second resin layer 120 may have a thickness from 10 µm to 100 µm, for example.

<<Battery Element>>

As illustrated in FIG. 1, battery element 200 includes an electrode part 210 and a resin part 220.

(Electrode Part)

Electrode part 210 has a first main face 211, a second main face 212, and a side face 213. First main face 211 is substantially parallel to second main face 212. Second main face 212 is positioned opposite to first main face 211. Side face 213 connects first main face 211 and second main face 212 to each other. Side face 213 may have projections and depressions. The projections and depressions of side face 213 may be filled by resin part 220.

Electrode part 210 includes one or more stacked units 215. Electrode part 210 may include only a single stacked unit 215. Electrode part 210 may include a plurality of stacked units 215. For example, electrode part 210 may include 2 to 200 stacked units 215. For example, electrode part 210 may include 10 to 100 stacked units 215.

The plurality of stacked units 215 are stacked in a direction from first main face 211 toward second main face 212. Hereinafter, in the present embodiment, the "direction from first main face 211 toward second main face 212" is also called "stacking direction". The stacking direction in FIG. 1 is parallel to the z-axis direction. The plurality of stacked units 215 may be electrically connected in parallel. The plurality of stacked units 215 may be electrically connected in series.

(Stacked Unit)

Figure 3:
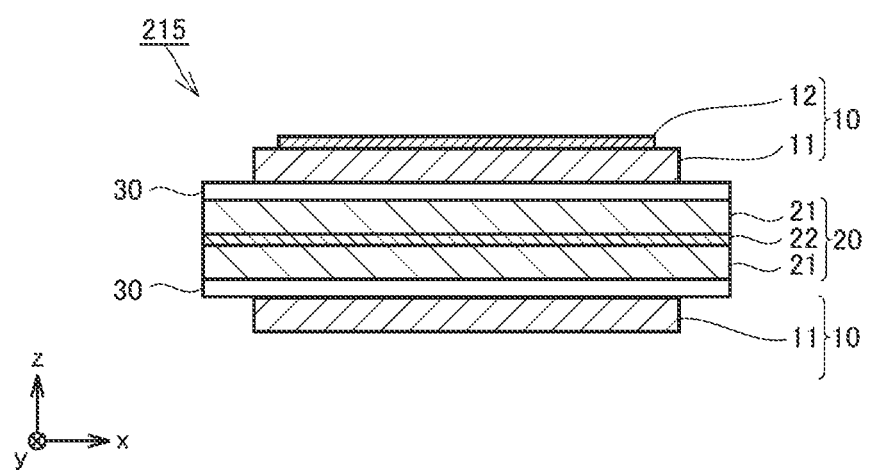
FIG. 3 is a schematic cross-sectional view illustrating an example of the stacked unit.

FIG. 3 is a schematic cross-sectional view illustrating an example of the stacked unit.

Each stacked unit 215 includes a positive electrode layer 10, a solid electrolyte layer 30, and a negative electrode layer 20. Positive electrode layer 10, solid electrolyte layer 30, and negative electrode layer 20 are stacked in the z-axis direction. In other words, positive electrode layer 10, solid electrolyte layer 30, and negative electrode layer 20 are stacked in the direction from first main face 211 toward second main face 212 (stacking direction).

Stacked unit 215 may have any configuration as long as it includes one or more of each of positive electrode layer 10 (a positive electrode active material layer 11), solid electrolyte layer 30, and negative electrode layer 20 (a negative electrode active material layer 21). For example, as illustrated in FIG. 3, stacked unit 215 may include two positive electrode layers 10, two solid electrolyte layers 30, and one negative electrode layer 20. For example, stacked unit 215 may include one positive electrode layer 10, two solid electrolyte layers 30, and two negative electrode layers 20. For example, stacked unit 215 may consist of one positive electrode active material layer 11, one solid electrolyte layer 30, and one negative electrode active material layer 21.

(Positive Electrode Layer)

Figure 8:
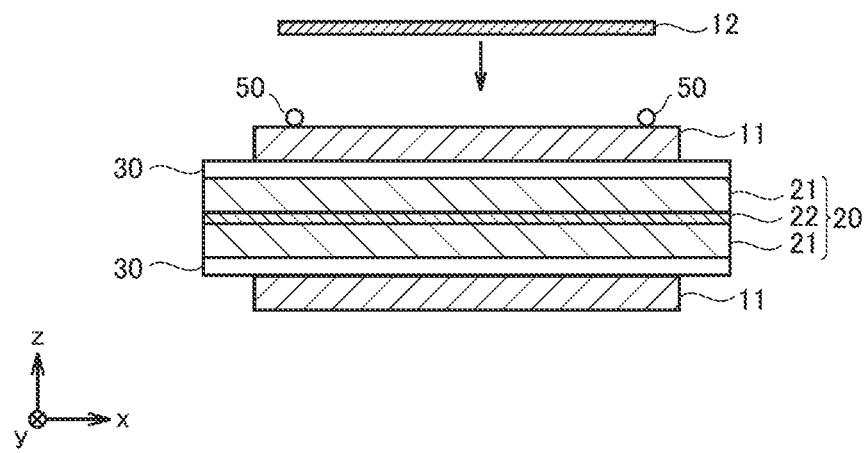
FIG. 8 is a fourth schematic view illustrating an example of the method of forming an electrode part.

Positive electrode layer 10 includes positive electrode active material layer 11. Positive electrode layer 10 may solely consist of positive electrode active material layer 11. Positive electrode layer 10 may further include a positive electrode current collector 12. In other words, positive electrode layer 10 may include positive electrode active material layer 11 and positive electrode current collector 12. For example, positive electrode current collector 12 may be adhered to positive electrode active material layer 11 with the use of an adhesive 50 (FIG. 8). Positive electrode active material layer 11 may have projections and depressions on a surface thereof. As a result, gaps tend to be formed between positive electrode current collector 12 and positive electrode active material layer 11. According to the below-described production method according to the present embodiment, such gaps between positive electrode current collector 12 and positive electrode active material layer 11 may also be reduced. Thus, positive electrode current collector 12 and positive electrode active material layer 11 may come into close adhesion. As a result, resistance of battery element 200 may be reduced.

Adhesive 50 may include a hot-melt adhesive and/or the like, for example. The melting point of the hot-melt adhesive may be lower than the temperature at which a material of the battery deteriorates. This may allow, for example, the hot-melt adhesive to be melted and cured without deteriorating materials of the battery. The adhesive may include ethylene vinyl acetate copolymer (EVA), low-density polyethylene (LDPE), and/or the like, for example.

Positive electrode current collector 12 may have a thickness from 5 µm to 50 µm, for example. Positive electrode current collector 12 may have a thickness from 10 µm to 20 µm, for example. Positive electrode current collector 12 may include a metal foil and a carbon film (not illustrated), for example. The metal foil may include at least one selected from the group consisting of Al, stainless steel, nickel (Ni), chromium (Cr), platinum (Pt), niobium (Nb), iron (Fe), titanium (Ti), and zinc (Zn), for example. The metal foil may be an Al foil and/or the like, for example.

The carbon film covers a part of a surface of the metal foil. The carbon film may be interposed between the metal foil and positive electrode active material layer 11, for example. The carbon film includes a carbon material. The carbon material may include carbon black and/or the like (such as acetylene black), for example. The carbon film may further include a binder and/or the like. The binder may include polyvinylidene difluoride (PVdF) and/or the like, for example. The carbon film may be made of, for example, the carbon material by 10 mass % to 20 mass % with the remainder being made up of the binder. The carbon film may be made of, for example, the carbon material by about 15 mass % and the binder by about 85 mass %.

Positive electrode active material layer 11 may have a thickness from 0.1 µm to 1000 µm, for example. Positive electrode active material layer 11 may have a thickness from 50 μm to 200 μm, for example. Positive electrode active material layer 11 includes a positive electrode active material. Positive electrode active material layer 11 may further include a solid electrolyte, a conductive material, a binder, and/or the like, for example.

The positive electrode active material may be a powder material, for example. The positive electrode active material may have a median diameter from 1 μm to 30 μm, for example. The median diameter refers to a particle size in volume-based particle size distribution at which the cumulative particle volume (accumulated from the side of small sizes) reaches 50% of the total particle volume. The median diameter may be measured with a laser-diffraction particle size distribution analyzer. The positive electrode active material may have a median diameter from 5 μm to 15 μm, for example.

The positive electrode active material may include any component. The positive electrode active material may include at least one selected from the group consisting of lithium cobalt oxide, lithium nickel oxide, lithium manganese oxide, lithium nickel cobalt manganese oxide (such as $LiNi_{1/3}Co_{1/3}Mn_{1/3}O_2$), lithium nickel cobalt aluminate, and lithium iron phosphate, for example. The positive electrode active material may have received a surface treatment. By this surface treatment, a buffer layer may be formed on a surface of the positive electrode active material. The buffer layer may include lithium niobium oxide ($LiNbO_3$) and/or the like, for example. The buffer layer may inhibit formation of a lithium depletion layer. Thus, battery resistance may be reduced.

The solid electrolyte may be a powder material, for example. The solid electrolyte may have a median diameter from 0.1 μm to 10 μm, for example. The solid electrolyte may have a median diameter from 1 μm to 5 μm, for example.

The solid electrolyte is ionically conductive. Substantially, the solid electrolyte is not electronically conductive. The solid electrolyte may include a sulfide-based solid electrolyte and/or the like, for example. The solid electrolyte may include an oxide-based solid electrolyte and/or the like, for example. The amount of the solid electrolyte may be, for example, from 1 part by mass to 200 parts by mass relative to 100 parts by mass of the positive electrode active material.

The sulfide-based solid electrolyte may be in a glass state. The sulfide-based solid electrolyte may form glass ceramic (also called "crystallized glass"). The sulfide-based solid electrolyte may include any component as long as it includes sulfur (S). For example, the sulfide-based solid electrolyte may include lithium phosphorus sulfide and/or the like.

Lithium phosphorus sulfide may be represented by, for example, the following formula (I):

$$Li_{2x}P_{2-2x}S_{5-4x}(0.5 \leq x \leq 1) \quad (I)$$

Lithium phosphorus sulfide may have a composition such as $Li_3PS_4$, $Li_7P_3S_{11}$, and the like, for example.

The sulfide-based solid electrolyte may be synthesized by a mechanochemical method. The composition of the sulfide-based solid electrolyte may be expressed as, for example, the mixing ratio of its raw materials. For example, "$75Li_2S$-$25P_2S_5$" means that the amount-of-substance fraction of "$Li_2S$" is 0.75 relative to all the raw materials and the amount-of-substance fraction of "$P_2S_5$" is 0.25 relative to all the raw materials. The sulfide-based solid electrolyte may include at least one selected from the group consisting of $50Li_2S$-$50P_2S_5$, $60Li_2S$-$40P_2S_5$, $70Li_2S$-$30P_2S_5$, $75Li_2S$-$25P_2S_5$, $80Li_2S$-$20P_2S_5$, and $90Li_2S$-$10P_2S_5$, for example.

For example, "$Li_2S$—$P_2S_5$" indicates that the mixing ratio of "$Li_2S$" and "$P_2S_5$" is not limited. For example, the sulfide-based solid electrolyte may include a lithium halide and/or the like. For example, the sulfide-based solid electrolyte may include at least one selected from the group consisting of $Li_2S$—$P_2S_5$, $Li_2S$—$S_5$, $LiI$—$Li_2SiS_2$, $LiI$—$Si_2S$—$P_2S_5$, $LiI$—$LiBr$—$Li_2S$—$P_2S_5$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$.

The oxide-based solid electrolyte may include any component as long as it includes oxygen (O). For example, the oxide-based solid electrolyte may include at least one selected from the group consisting of lithium phosphorus oxynitride (LIPON), lithium zinc germanate (LISICON), lithium lanthanum zirconium oxide (LLZO), and lithium lanthanum titanium oxide (LLTO).

The conductive material is electronically conductive. The conductive material may include any component. The conductive material may include at least one selected from the group consisting of carbon black (such as acetylene black, for example), vapor grown carbon fiber (VGCF), carbon nanotube (CNT), and graphene flake, for example. The amount of the conductive material may be, for example, from 0.1 parts by mass to 10 parts by mass relative to 100 parts by mass of the positive electrode active material.

The binder binds solid materials to each other. The binder may include any component. The binder may include a fluoro resin and/or the like, for example. The binder may include at least one selected from the group consisting of PVdF and vinylidene difluoride-hexafluoropropylene copolymer (PVdF-HFP), for example. The amount of the binder may be, for example, from 0.1 parts by mass to 10 parts by mass relative to 100 parts by mass of the positive electrode active material.

(Negative Electrode Layer)

Negative electrode layer 20 includes negative electrode active material layer 21. Negative electrode layer 20 may solely consist of negative electrode active material layer 21. Negative electrode layer 20 may further include a negative electrode current collector 22. In other words, negative electrode layer 20 may include negative electrode active material layer 21 and negative electrode current collector 22. Negative electrode active material layer 21 may be formed on a surface of negative electrode current collector 22. For example, negative electrode active material layer 21 may coat only one side of negative electrode current collector 22. For example, negative electrode active material layer 21 may coat both sides of negative electrode current collector 22.

Negative electrode current collector 22 may have a thickness from 5 μm to 50 μm, for example. Negative electrode current collector 22 may have a thickness from 5 μm to 15 μm, for example. Negative electrode current collector 22 may include a metal foil and/or the like, for example. The metal foil may include at least one selected from the group consisting of stainless steel, copper (Cu), Ni, Fe, Ti, cobalt (Co), and Zn, for example. The metal foil may be a Ni foil, a Ni-plated Cu foil, a Cu foil, or the like, for example.

Negative electrode active material layer 21 may have a thickness from 0.1 μm to 1000 μm, for example. Negative electrode active material layer 21 may have a thickness from 50 μm to 200 μm, for example. Negative electrode active material layer 21 includes a negative electrode active material. Negative electrode active material layer 21 may further include a solid electrolyte, a conductive material, a binder, and/or the like, for example.

The negative electrode active material may be a powder material, for example. The negative electrode active material may have a median diameter from 1 μm to 30 μm, for example. The negative electrode active material may have a median diameter from 1 μm to 10 μm, for example.

The negative electrode active material may include any component. The negative electrode active material may include at least one selected from the group consisting of lithium titanium oxide ($Li_4Ti_5O_{12}$), graphite, soft carbon, hard carbon, silicon, silicon oxide, silicon-based alloy, tin, tin oxide, and tin-based alloy, for example.

The details of the solid electrolyte are as described above. The composition of the solid electrolyte included in negative electrode active material layer 21 may be the same as the composition of the solid electrolyte included in positive electrode active material layer 11. The composition of the solid electrolyte included in negative electrode active material layer 21 may be different from the composition of the solid electrolyte included in positive electrode active material layer 11. The amount of the solid electrolyte may be, for example, from 1 part by mass to 200 parts by mass relative to 100 parts by mass of the negative electrode active material.

The details of the conductive material are as described above. The composition of the conductive material included in negative electrode active material layer 21 may be the same as the composition of the conductive material included in positive electrode active material layer 11. The composition of the conductive material included in negative electrode active material layer 21 may be different from the composition of the conductive material included in positive electrode active material layer 11. The amount of the conductive material may be, for example, from 0.1 parts by mass to 10 parts by mass relative to 100 parts by mass of the negative electrode active material.

The details of the binder are as described above. The composition of the binder included in negative electrode active material layer 21 may be the same as the composition of the binder included in positive electrode active material layer 11. The composition of the binder included in negative electrode active material layer 21 may be different from the composition of the binder included in positive electrode active material layer 11. The amount of the binder may be, for example, from 0.1 parts by mass to 10 parts by mass relative to 100 parts by mass of the negative electrode active material.

(Solid Electrolyte Layer)

Solid electrolyte layer 30 may have a thickness from 0.1 μm to 1000 μm, for example. Solid electrolyte layer 30 may have a thickness from 0.1 μm to 300 μm, for example. Solid electrolyte layer 30 is interposed between positive electrode layer 10 (positive electrode active material layer 11) and negative electrode layer 20 (negative electrode active material layer 21). In a way, solid electrolyte layer 30 serves as a separator. Solid electrolyte layer 30 physically separates positive electrode layer 10 from negative electrode layer 20. Solid electrolyte layer 30 spatially separates positive electrode layer 10 from negative electrode layer 20. Solid electrolyte layer 30 interrupts electronic conduction between positive electrode layer 10 and negative electrode layer 20.

Solid electrolyte layer 30 includes a solid electrolyte. Solid electrolyte layer 30 forms an ion conduction path between positive electrode layer 10 and negative electrode layer 20. Solid electrolyte layer 30 may further include a binder and/or the like, for example.

The details of the solid electrolyte are as described above. The composition of the solid electrolyte included in solid electrolyte layer 30 may be the same as the composition of the solid electrolyte included in positive electrode active material layer 11. The composition of the solid electrolyte included in solid electrolyte layer 30 may be different from the composition of the solid electrolyte included in positive electrode active material layer 11. The composition of the solid electrolyte included in solid electrolyte layer 30 may be the same as the composition of the solid electrolyte included in negative electrode active material layer 21. The composition of the solid electrolyte included in solid electrolyte layer 30 may be different from the composition of the solid electrolyte included in negative electrode active material layer 21.

The binder may include any component. The binder may include at least one selected from the group consisting of PVdF-HFP, butyl rubber (IIR), and butadiene rubber (BR), for example.

(Resin Part)

As illustrated in FIG. 1, resin part 220 covers at least a part of side face 213 of electrode part 210. Resin part 220 may cover a part of side face 213. Resin part 220 may cover the entire side face 213. For example, when the planar shape of electrode part 210 is rectangular, electrode part 210 has four side faces 213. For example, an opposing pair of side faces 213 may be covered by resin part 220. The planar shape according to the present embodiment refers to the shape in a plane that is parallel to the x-y plane in FIG. 1.

Neither first main face 211 nor second main face 212 is covered by resin part 220. Resin part 220 may be formed continuously in the z-axis direction from first main face 211 to second main face 212.

Resin part 220 includes a resin cured product. Resin part 220 may consist essentially of a resin cured product. The resin cured product is formed by curing a curable resin material. Resin part 220 may include a photocurable resin cured product, a thermocurable resin cured product, an electron-beam-curable resin cured product, and the like, for example. Resin part 220 may include at least one selected from the group consisting of a photocurable resin cured product and a thermocurable resin cured product, for example. Resin part 220 may include at least one selected from the group consisting of epoxy resin, acrylic resin, polyimide resin, polyester resin, polypropylene resin, polyamide resin, polystyrene resin, polyvinyl chloride resin, and polycarbonate resin, for example.

<<Restraint Component>>>

As illustrated in FIG. 1, restraint component 300 is mounted outside case 100. Restraint component 300 is configured to apply pressure to battery element 200 through application of pressure to both sides of battery element 200 in the stacking direction (the z-axis direction).

Restraint component 300 may include, for example, a first restraint plate 311, a second restraint plate 312, a connecting rod 321, and a bolt 322. For example, case 100 and battery element 200 are interposed between first restraint plate 311 and second restraint plate 312. Each of first restraint plate 311 and second restraint plate 312 is in physical contact with case 100. Connecting rod 321 connects first restraint plate 311 and second restraint plate 312 to each other. Each end of connecting rod 321 has an internal thread part. The internal thread part engages with bolt 322. When bolt 322 is tightened, pressure is applied to battery element 200 by first restraint plate 311 and second restraint plate 312. The pressure is transferred via case 100 to battery element 200.

Each of first restraint plate 311 and second restraint plate 312 may include at least one selected from the group consisting of a metal material and a resin material, for example. Each of first restraint plate 311 and second restraint plate 312 may be a flat plate, for example. Each of first restraint plate 311 and second restraint plate 312 may be a plate with projections and depressions, for example.

In the present embodiment, the restraining pressure applied to resin part 220 is different from the restraining pressure applied to electrode part 210. Restraint component 300 applies a first pressure ($P_1$) to electrode part 210. Restraint component 300 applies a second pressure ($P_2$) to resin part 220. The pressure ratio ($P_2/P_1$) is from 1.5 to 18.

When the pressure ratio ($P_2/P_1$) is lower than 1.5, resin part 220 tends to break. When the pressure ratio ($P_2/P_1$) is higher than 18, case 100 tends to break. When the pressure ratio ($P_2/P_1$) is from 1.5 to 18, breaks in both resin part 220 and case 100 may be reduced. The pressure ratio ($P_2/P_1$) may be from 1.5 to 4.8, for example. The pressure ratio ($P_2/P_1$) may be from 4.8 to 18, for example.

The first pressure ($P_1$) may be from 0.5 MPa to 50 MPa, for example. The first pressure ($P_1$) may be from 0.5 MPa to 10 MPa, for example. The first pressure ($P_1$) may be from 0.5 MPa to 5 MPa, for example. The first pressure ($P_1$) may be from 0.5 MPa to 2 MPa, for example. The first pressure ($P_1$) may be from 0.5 MPa to 1.5 MPa, for example.

The first pressure ($P_1$) and the second pressure ($P_2$) may be measured with a tactile sensor system. The tactile sensor system includes a sensor sheet. The sensor sheet has a thickness of about 0.1 mm. The sensor sheet is interposed between case 100 and first restraint plate 311. The sensor sheet may be interposed between case 100 and second restraint plate 312. The sensor sheet includes a plurality of sensing points across the plane thereof. The arithmetic mean of the pressures sensed at a group of sensing points that are positioned to face electrode part 210 is regarded as the first pressure ($P_1$). The arithmetic mean of the pressures sensed at a group of sensing points that are positioned to face resin part 220 is regarded as the second pressure ($P_2$). The pressure ratio ($P_2/P_1$) is significant to one decimal place. It is rounded to one decimal place.

<Production Method>

Figure 4:
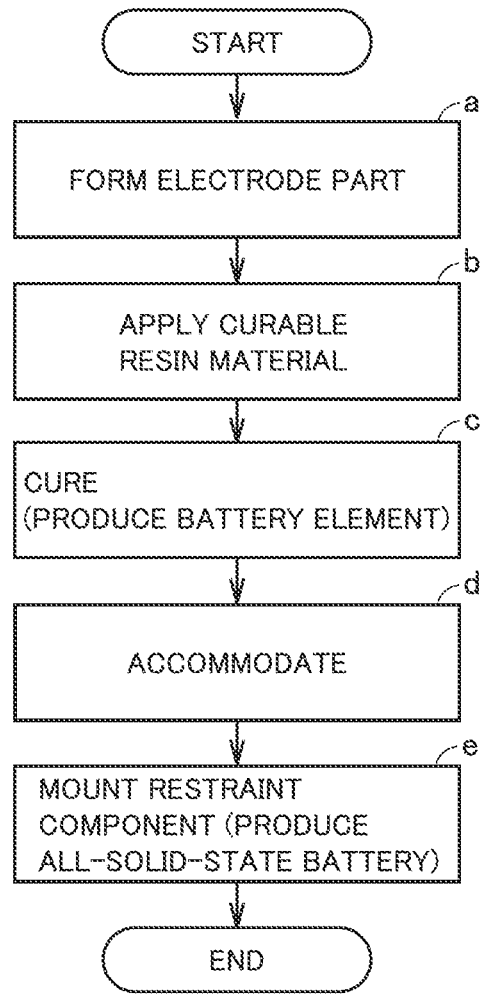
FIG. 4 is a schematic flowchart of the production method according to the present embodiment.

FIG. 4 is a schematic flowchart of the production method according to the present embodiment.

The production method according to the present embodiment includes "(a) forming an electrode part", "(b) applying a curable resin material", "(c) curing", "(d) accommodating", and "(e) mounting a restraint component".

A series of steps from "(a) forming an electrode part" to "(c) curing" may constitute "a method of producing a battery element".

A series of steps from "(a) forming an electrode part" to "(e) mounting a restraint component" may constitute "a method of producing an all-solid-state battery".

<<(a) Forming Electrode Part>>

The production method according to the present embodiment includes forming electrode part 210. Electrode part 210 includes one or more stacked units 215.

Stacked unit 215 includes positive electrode layer 10, solid electrolyte layer 30, and negative electrode layer 20. Each of positive electrode layer 10, solid electrolyte layer 30, and negative electrode layer 20 may be formed by, for example, paste application.

For example, a positive electrode active material, a solid electrolyte, a conductive material, a binder, and a dispersion medium may be mixed to prepare a positive electrode paste. The details of the positive electrode active material and the like are as described above. The dispersion medium may be butyl butyrate and/or the like, for example. The solid fraction of the positive electrode paste may be from 60 mass % to 80 mass %, for example. The solid fraction according to the present embodiment refers to the sum of the mass fractions of the components except the dispersion medium. Butyl butyrate tends to have a low reactivity with a sulfide-based solid electrolyte, for example. The positive electrode paste may be applied to a surface of a temporary support 40 and then dried, and thereby positive electrode active material layer 11 may be formed. Temporary support 40 may be an Al foil and/or the like, for example. The positive electrode paste may be applied to a surface of positive electrode current collector 12.

For example, a solid electrolyte, a binder, and a dispersion medium may be mixed to prepare a solid electrolyte paste. The details of the solid electrolyte and the like are as described above. The dispersion medium may be butyl butyrate, heptane, and/or the like, for example. The solid fraction of the solid electrolyte paste may be from 60 mass % to 80 mass %, for example. The solid electrolyte paste may be applied to a surface of a temporary support 40 and then dried, and thereby solid electrolyte layer 30 may be formed. Temporary support 40 may be an Al foil and/or the like, for example.

For example, a negative electrode active material, a solid electrolyte, a conductive material, a binder, and a dispersion medium may be mixed to prepare a negative electrode paste. The details of the negative electrode active material and the like are as described above. The dispersion medium may be butyl butyrate and/or the like, for example. The solid fraction of the negative electrode paste may be from 60 mass % to 80 mass %, for example. The negative electrode paste may be applied to a surface of negative electrode current collector 22 and then dried, and thereby negative electrode active material layer 21 may be formed. The negative electrode paste may be applied to a surface of a temporary support 40. Temporary support 40 may be a Ni foil and/or the like, for example.

Figure 5:
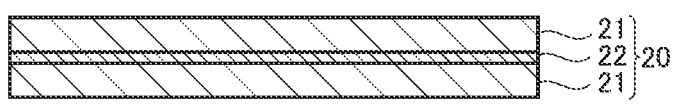
FIG. 5 is a first schematic view illustrating an example of the method of forming an electrode part.

FIG. 5 is a first schematic view illustrating an example of the method of forming an electrode part.

For example, negative electrode active material layer 21 may be formed on both sides of negative electrode current collector 22, and thereby negative electrode layer 20 may be formed.

Figure 6:
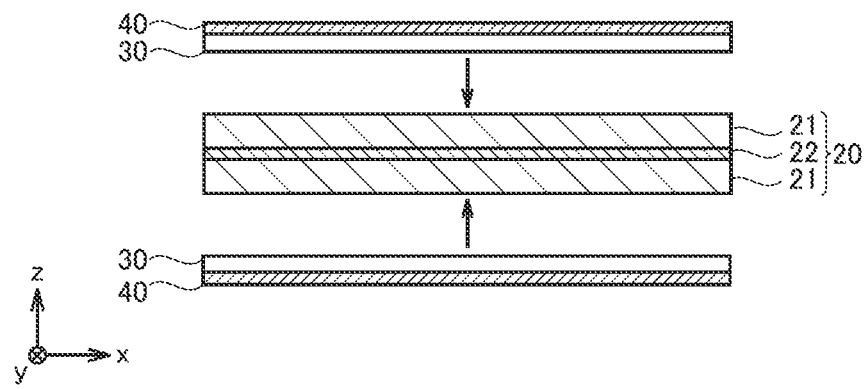
FIG. 6 is a second schematic view illustrating an example of the method of forming an electrode part.

FIG. 6 is a second schematic view illustrating an example of the method of forming an electrode part.

For example, solid electrolyte layer 30 may be formed on a surface of temporary support 40. For example, this solid electrolyte layer 30 may be placed on a surface of each of two negative electrode active material layers 21, and the resulting stack may be passed through a roll press apparatus. Thus, solid electrolyte layer 30 may come into adhesion to the surface of each negative electrode active material layer 21. The press temperature may be about 25° C., for example. The press pressure may be about 100 MPa, for example. After adhesion, temporary support 40 is peeled off from solid electrolyte layer 30.

Figure 7:
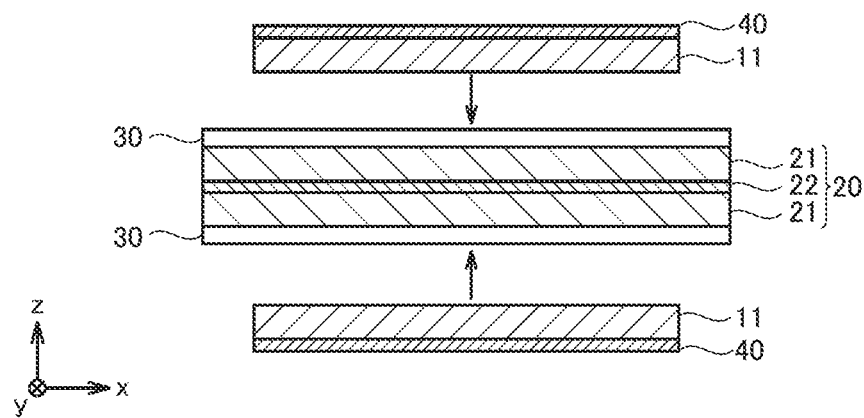
FIG. 7 is a third schematic view illustrating an example of the method of forming an electrode part.

FIG. 7 is a third schematic view illustrating an example of the method of forming an electrode part.

For example, positive electrode active material layer 11 may be formed on a surface of temporary support 40. For example, this positive electrode active material layer 11 may be placed on a surface of each of two solid electrolyte layers 30, and the resulting stack may be passed through a roll press apparatus. Thus, positive electrode active material layer 11 may come into adhesion to the surface of each solid electrolyte layer 30. The press temperature may be about 25° C., for example. The press pressure may be about 100 MPa, for example. After adhesion, temporary support 40 is peeled off from positive electrode active material layer 11. Thus, stacked unit 215 is formed.

Subsequently, stacked unit 215 may be passed through a roll press apparatus. The press temperature may be from about 100° C. to about 150° C., for example. The press pressure may be about 600 MPa, for example.

FIG. 8 is a fourth schematic view illustrating an example of the method of forming an electrode part.

On a surface of positive electrode active material layer 11, adhesive 50 is placed. Pressing is performed to bring positive electrode current collector 12 into adhesion to positive electrode active material layer 11. The press temperature may be about 140° C., for example. The press pressure may be about 1 MPa, for example.

Figure 9:
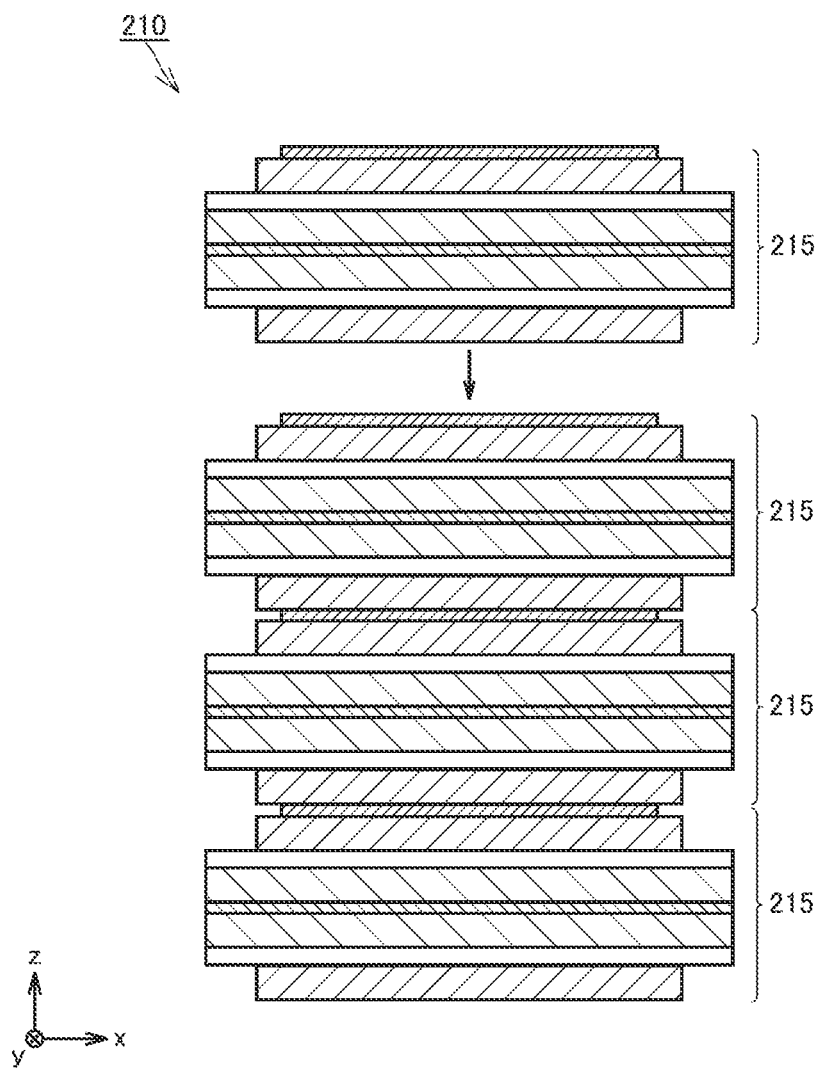
FIG. 9 is a fifth schematic view illustrating an example of the method of forming an electrode part.

FIG. 9 is a fifth schematic view illustrating an example of the method of forming an electrode part.

Only a single stacked unit 215 may form electrode part 210. A plurality of stacked units 215 may form electrode part 210. The plurality of stacked units 215 are stacked in a single, predetermined direction.

Thus, electrode part 210 is formed. As illustrated in FIG. 1, electrode part 210 has first main face 211, second main face 212, and side face 213. Second main face 212 is positioned opposite to first main face 211. Side face 213 connects first main face 211 and second main face 212 to each other. Positive electrode layer 10, solid electrolyte layer 30, and negative electrode layer 20 are stacked in the stacking direction (z-axis direction).

Figure 10:
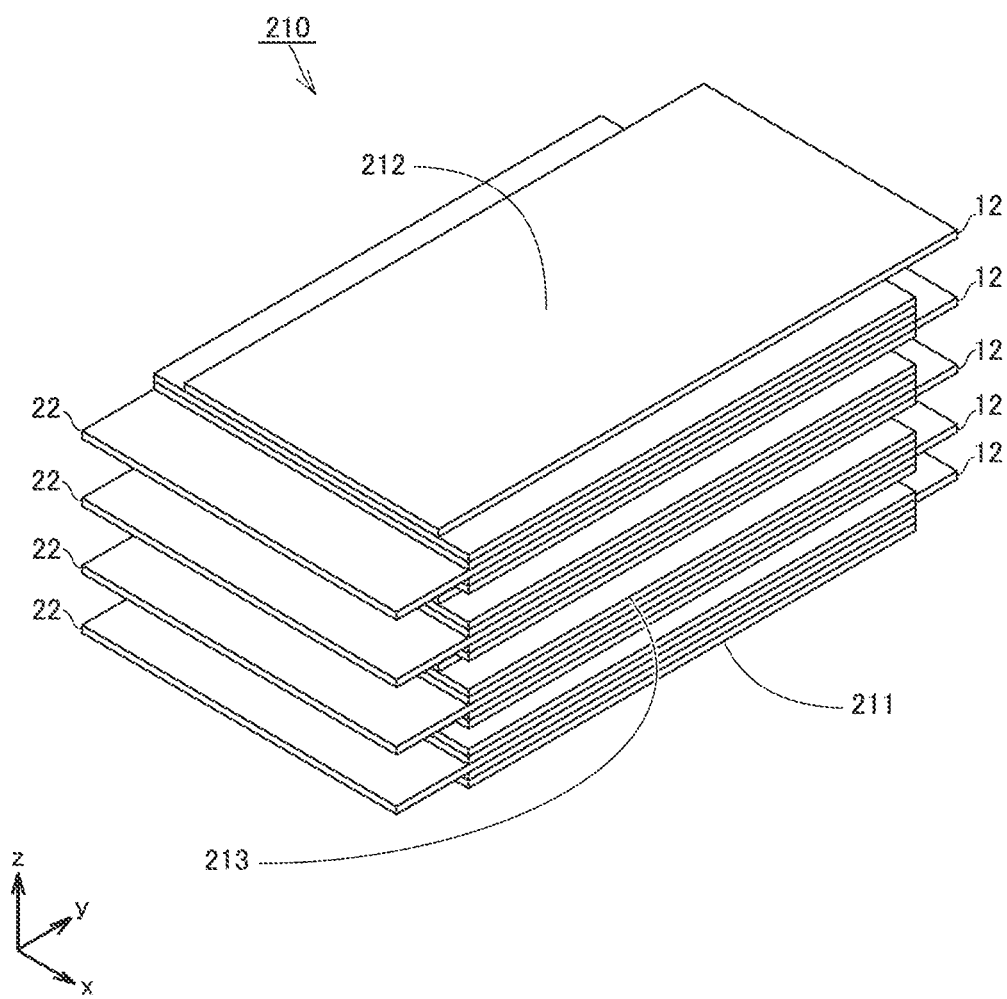
FIG. 10 is a schematic view illustrating an example of the electrode part.

FIG. 10 is a schematic view illustrating an example of the electrode part.

For example, positive electrode current collector 12 may protrude from electrode part 210 in the y-axis direction. For example, negative electrode current collector 22 may protrude from electrode part 210 in the y-axis direction. The direction in which negative electrode current collector 22 protrudes may be opposite to the direction in which positive electrode current collector 12 protrudes. The protruding portion of positive electrode current collector 12 may be connected to, for example, an external terminal (not illustrated). The protruding portion of negative electrode current collector 22 may be connected to, for example, an external terminal (not illustrated).

<<(b) Applying Curable Resin Material>>

The production method according to the present embodiment includes applying a curable resin material to electrode part 210 to form resin part 220.

In the present embodiment, pressure ($P_0$) is applied to electrode part 210 through application of pressure to both sides of electrode part 210 in the stacking direction while a curable resin material 221 is being applied to side face 213 of electrode part 210 and cured.

Figure 11:
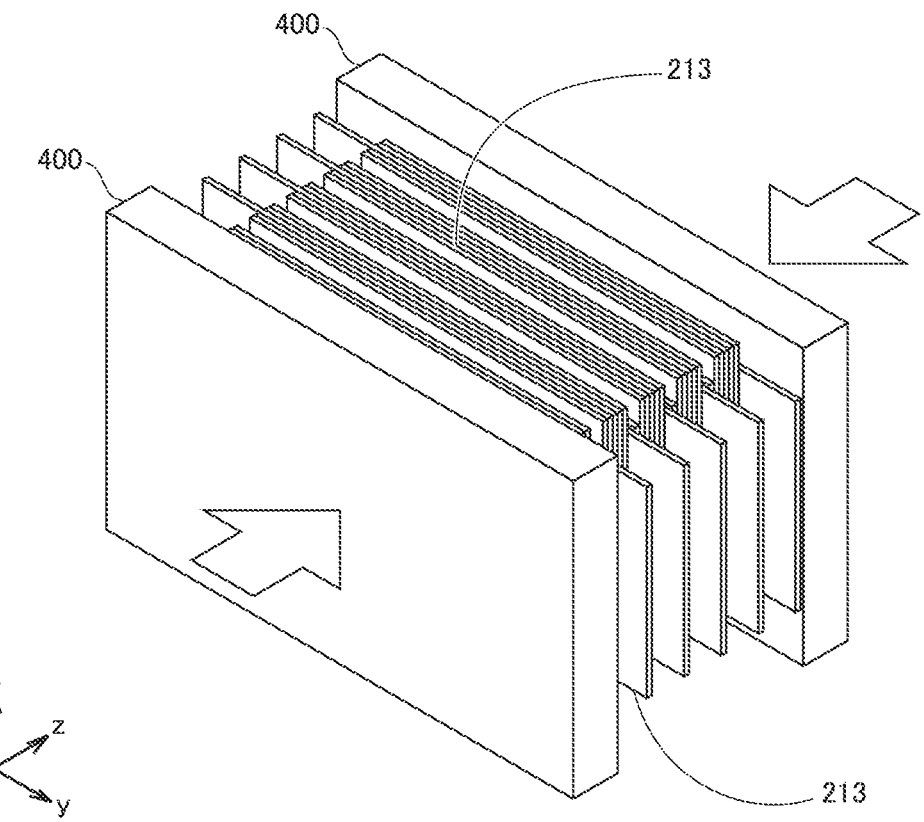
FIG. 11 is a first schematic view illustrating an example of the method of application and curing.

FIG. 11 is a first schematic view illustrating an example of the method of application and curing.

For example, two frame plates 400 are prepared. Between these two frame plates 400, electrode part 210 is interposed. For example, to two side faces 213 parallel to the y-z plane in FIG. 11, the curable resin material may be applied. Frame plates 400 may include a material that has a good releasability. Frame plates 400 may include a fluoro resin and/or the like, for example. Frame plates 400 may include Teflon (registered trademark) and/or the like, for example.

Figure 12:
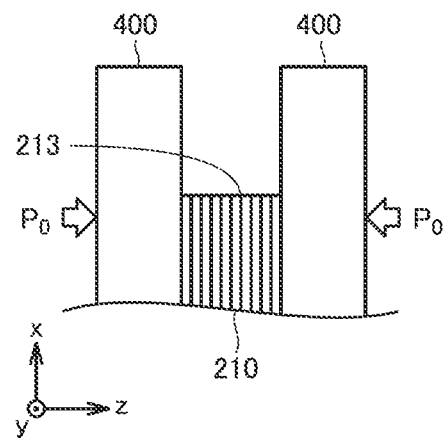
FIG. 12 is a second schematic view illustrating an example of the method of application and curing.

FIG. 12 is a second schematic view illustrating an example of the method of application and curing.

Frame plates 400 are secured so that pressure ($P_0$) is applied to electrode part 210. For example, pressure ($P_0$) may be adjusted so as to ensure a sufficiently close adhesion between the layers of electrode part 210. Pressure ($P_0$) may be adjusted so as to avoid excessive deformation of electrode part 210.

Pressure ($P_0$) may be adjusted by any method. For example, pressure ($P_0$) may be adjusted by mechanical pressing. For example, the torque of a servomotor may be converted by a ball screw into a force for pressing frame plates 400. For example, hydraulic pressing may be used to press frame plates 400. For example, pressure applied by gas may be used to press frame plates 400. Pressure ($P_0$) may be measured with a tactile sensor system. After pressure ($P_0$) is adjusted to a predetermined value, frame plates 400 may be secured with a mechanical stopper, for example. Thus, energy consumption for motor operation may be reduced, for example.

The pressure applied to electrode part 210 ($P_0$) may be from 0.03 MPa to 0.05 MPa, for example. When pressure ($P_0$) is from 0.03 MPa to 0.05 MPa, a pressure ratio ($P_2/P_1$) during restraint from 1.5 to 18 may be achieved, for example. Pressure ($P_0$) may be from 0.03 MPa to 0.04 MPa, for example. Pressure ($P_0$) may be from 0.04 MPa to 0.05 MPa, for example.

The pressure applied to electrode part 210 ($P_0$) may be from 0.05 MPa to 3 MPa, for example. When pressure ($P_0$) is from 0.05 MPa to 3 MPa, resistance of battery element 200 may be reduced, for example. This phenomenon may occur as a result of electrode part 210 being rendered dense. Pressure ($P_0$) may be from 0.1 MPa to 3 MPa, for example. Pressure ($P_0$) may be from 1 MPa to 3 MPa, for example. Pressure ($P_0$) may be from 2 MPa to 3 MPa, for example.

Figure 13:
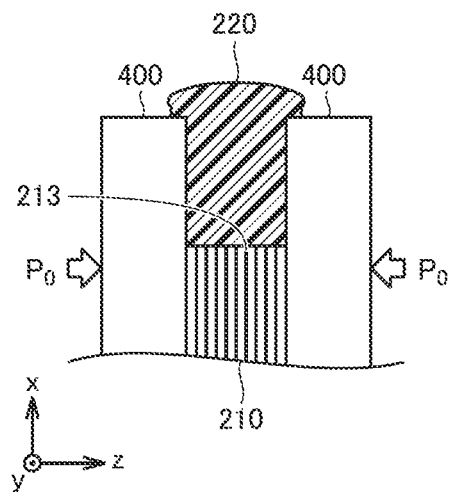
FIG. 13 is a third schematic view illustrating an example of the method of application and curing.

FIG. 13 is a third schematic view illustrating an example of the method of application and curing.

Into the space defined by side face 213 of electrode part 210 and two frame plates 400, a curable resin material is filled. Thus, resin part 220 is formed. Excess curable resin material spilling outside the space may be scraped off with a scraper and/or the like, for example.

The curable resin material may include a photocurable resin material, a thermocurable resin material, an electron-beam-curable resin material, and/or the like, for example. The curable resin material may include, for example, at least one selected from the group consisting of a photocurable resin material and a thermocurable resin material. The photocurable resin material may include an ultraviolet (UV) curable resin material and/or the like, for example. "Aronix (registered trademark) UV products" manufactured by Toagosei Co., Ltd. and/or the like may be used, for example. The photocurable resin material may have an advantage such as short curing time, for example.

The curable resin material is fluid. The curable resin material may have a viscosity from 5000 mPa·s to 50000 mPa·s, for example. When the viscosity is within this range, the curable resin material tends to appropriately permeate into gaps between electrode layers. For example, when the viscosity is lower than 5000 mPa·s, permeation of the curable resin material into gaps between electrode layers may become excessive and thereby, for example, battery capacity may be reduced. For example, when the viscosity is higher than 50000 mPa·s, the curable resin material is less fluid and thereby gaps may be left in resin part 220.

The viscosity of the curable resin material is measured with an E type viscometer (cone-plate type) at 25° C.±1° C. For example, an E type viscometer manufactured by Toki Sangyo Co., Ltd. may be used.

<<(c) Curing>>

The production method according to the present embodiment includes curing the curable resin material after the forming resin part 220 to produce battery element 200.

Figure 14:
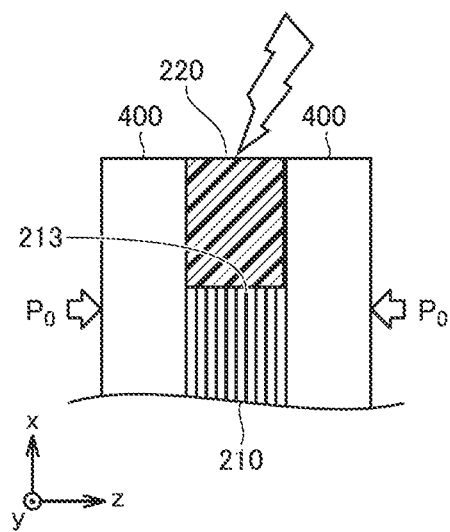
FIG. 14 is a fourth schematic view illustrating an example of the method of application and curing.

FIG. 14 is a fourth schematic view illustrating an example of the method of application and curing.

Depending on the type of the curable resin material, various curing treatments are performed. For example, when the curable resin material is a UV-curable resin material, the UV-curable resin material is irradiated with UV. For example, when the curable resin material is a thermocurable resin material, the thermocurable resin material is heated. For example, when the curable resin material is an electron-beam-curable resin material, the electron-beam-curable resin material is irradiated with an electron beam.

Figure 15:
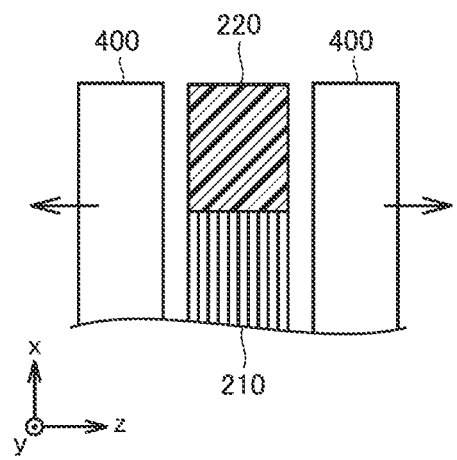
FIG. 15 is a fifth schematic view illustrating an example of the method of application and curing.

FIG. 15 is a fifth schematic view illustrating an example of the method of application and curing.

The curable resin material is cured, and thus a resin cured product is formed. After the resin cured product is formed, frame plates 400 are removed. Thus, battery element 200 is produced.

<<(d) Accommodating>>

The production method according to the present embodiment includes accommodating battery element 200 in case 100.

The details of case 100 are as described above. Case 100 may be a pouch made of a metal-laminated film, for example. Into the pouch, battery element 200 is accommodated. For example, the opening of the pouch may be sealed by the use of a heat sealer. Thus, the pouch may be hermetically sealed. During the sealing, the pouch may be evacuated of air.

<<(e) Mounting Restraint Component>>

The production method according to the present embodiment includes mounting restraint component 300 outside case 100 to produce all-solid-state battery 1000.

The details of restraint component 300 are as described above. Restraint component 300 is mounted so as to apply pressure to battery element 200 through application of pressure to both sides of battery element 200 in the stacking direction (the z-axis direction in FIG. 1).

In the present embodiment, due to the pressure ($P_0$) being applied during application and curing of the curable resin material, resistance of battery element 200 may be reduced. As a result, an intended level of battery resistance may be achieved with a low restraining pressure, for example.

Restraint component 300 may apply different pressures to electrode part 210 and resin part 220, respectively. More specifically, restraint component 300 applies the first pressure ($P_1$) to electrode part 210, and the restraint component applies the second pressure ($P_2$) to resin part 220. The pressure ratio ($P_2/P_1$) may be from 1.5 to 18, for example. Thus, breaks in both resin part 220 and case 100 may be reduced.

EXAMPLES

Hereinafter, examples according to the present disclosure (hereinafter also called "the present example") will be described. It should be noted that the description below does not limit the scope of claims.

First Experiment

In this first experiment, the correlation between the pressure ratio ($P_2/P_1$) during restraint and the occurrence of breaks was investigated.

<<Producing All-Solid-State Battery>>
(No. 1-1)
1. (a) Forming Electrode Part
1-1. Forming Positive Electrode Layer
Materials described below were prepared.
Positive electrode active material: $LiNi_{1/3}Co_{1/3}Mn_{1/3}O_2$, $LiNbO_3$
Solid electrolyte: $Li_3PS_4$
Conductive material: Acetylene black
Binder: PVdF
Dispersion medium: Butyl butyrate
Positive electrode current collector: Al foil (thickness, 15 μm)

A surface of $LiNi_{1/3}Co_{1/3}Mn_{1/3}O_2$ (particles) was covered with $LiNbO_3$, and thereby a buffer layer was formed. Thus, a positive electrode active material was prepared.

The positive electrode active material, the solid electrolyte, the conductive material, the binder, and the dispersion medium were mixed with a stirring apparatus, and thereby a positive electrode paste was prepared. The mass ratio between the positive electrode active material and the solid electrolyte was "(Positive electrode active material)/(Solid electrolyte)=75/25". The amount of the conductive material relative to 100 parts by mass of the positive electrode active material was 6 parts by mass. The amount of the binder relative to 100 parts by mass of the positive electrode active material was 4 parts by mass. The solid fraction of the positive electrode paste was 70 mass %.

The positive electrode paste was applied to a surface of positive electrode current collector 12 with a doctor blade applicator, and then dried. Thus, positive electrode active material layer 11 was formed. In other words, positive electrode layer 10 was formed. The drying temperature was 120° C. The drying duration was three hours.

1-2. Forming Negative Electrode Layer
Materials described below were prepared.
Negative electrode active material: $Li_4Ti_5O_{12}$
Solid electrolyte: $Li_3PS_4$
Conductive material: Acetylene black
Binder: PVdF
Dispersion medium: Butyl butyrate
Negative electrode current collector: Cu foil (thickness, 15 μm)

The negative electrode active material, the solid electrolyte, the conductive material, the binder, and the dispersion medium were mixed with a stirring apparatus, and thereby a negative electrode paste was prepared. The mass ratio between the negative electrode active material and the solid electrolyte was "(Negative electrode active material)/(Solid electrolyte)=50/50". The amount of the conductive material relative to 100 parts by mass of the negative electrode active material was 6 parts by mass. The amount of the binder relative to 100 parts by mass of the negative electrode active material was 6 parts by mass. The solid fraction of the negative electrode paste was 70 mass %.

The negative electrode paste was applied to a surface of negative electrode current collector 22 with a doctor blade applicator, and then dried. Thus, negative electrode active material layer 21 was formed. In other words, negative electrode layer 20 was formed. The drying temperature was 120° C. The drying duration was three hours.

1-3. Forming Solid Electrolyte Layer
Materials described below were prepared.
Solid electrolyte: $Li_3PS_4$
Binder: Butyl rubber
Dispersion medium: Heptane
Temporary support: Al foil (thickness, 15 μm)

The solid electrolyte, the binder, and the dispersion medium were mixed with an ultrasonic disperser, and thereby a solid electrolyte paste was prepared. The mass ratio between the solid electrolyte and the binder was "(Solid electrolyte)/(Binder)=95/5". The solid fraction of the solid electrolyte paste was 70 mass %.

The solid electrolyte paste was applied to a surface of temporary support 40 with a doctor blade applicator. After application, the solid electrolyte paste was air-dried. Thus, solid electrolyte layer 30 was formed. After air-drying, solid electrolyte layer 30 was further heated and dried. The drying temperature was 100° C. The drying duration was 30 minutes.

1-4. Forming Stacked Unit

Positive electrode layer 10, solid electrolyte layer 30, and negative electrode layer 20 were stacked in this order, and thereby stacked unit 215 was formed. Stacked unit 215 was passed through a roll press apparatus. The linear pressing pressure was 1 ton/cm ($1\times10^3$ kg/cm).

1-5. Forming Electrode Part

Ten stacked units 215 were stacked in a single, predetermined direction, and thereby electrode part 210 was formed.

2. (b) Applying Curable Resin Material

Between two frame plates 400, electrode part 210 was interposed. These two frame plates 400 were secured so that pressure ($P_0$) was applied to electrode part 210. In No. 1-1, pressure ($P_0$) was 1 MPa.

A curable resin material was prepared. The curable resin material was a UV-curable resin material. The curable resin material was applied to side face 213 of electrode part 210 while pressure ($P_0$) was being applied to electrode part 210. Thus, resin part 220 was formed.

3. (c) Curing

After resin part 220 was formed, the curable resin material was cured with a UV lamp while pressure ($P_0$) was being maintained. Thus, battery element 200 was produced.

4. (d) Accommodating

Case 100 was prepared. Case 100 included a pouch made of an aluminum-laminated film, as well as an external terminal. Battery element 200 and the external terminal were connected to each other. Battery element 200 was accommodated in case 100. After accommodation, case 100 was hermetically sealed.

5. (e) Mounting Restraint Component

Restraint component 300 was mounted outside case 100. In this way, all-solid-state battery 1000 (all-solid lithium-ion battery) was produced.

Restraint component 300 was mounted so as to apply pressure to battery element 200 through application of pressure to both sides of battery element 200 in the stacking direction. In the first experiment, the restraint state was adjusted so that the first pressure ($P_1$) applied to electrode part 210 was 1 MPa.

After restraining, all-solid-state battery 1000 was subjected to five cycles of charge and discharge. A single cycle of charge and discharge consisted of a sequence of "charge→rest→discharge→rest".

Charge: CCCV mode, CC current=⅓ C, CV voltage=2.9 V
Rest: 10 minutes
Discharge: CCCV mode, CC current=⅓ C, CV voltage=1.5 V
Rest: 10 minutes In the present example, "CCCV mode" refers to "constant current-constant voltage mode"; "CC current" refers to the current during constant-current charging (or during constant-current discharging); "⅓ C" refers to a current rate at which a battery is charged to (or discharged from) its full charge capacity in three hours; and "CV voltage" refers to the voltage during constant-voltage charging (or during constant-voltage discharging).

(No. 1-2 to No. 1-6)

All-solid-state battery 1000 was produced in the same manner as in No. 1-1 except that pressure ($P_0$) in "2. (b) Applying Curable Resin Material" and "3. (c) Curing" above was changed as specified in Table 1 below.

<<Evaluation>>

A tactile sensor system was prepared. The restraint state was loosened. A sensor sheet was interposed between case 100 and first restraint plate 311. The restraint state was adjusted again so that the first pressure ($P_1$) applied to electrode part 210 was 1 MPa. After the restraint state was adjusted, the second pressure ($P_2$) applied to resin part 220 was measured. Results are illustrated in Table 1 below.

After the pressure measurement, all-solid-state battery 1000 was disassembled. The presence or absence of breaks in resin part 220 was visually examined. The presence or absence of breaks in case 100 was examined with an SEM (scanning electron microscope). Results of the occurrence of breaks are illustrated in Table 1 below.

TABLE 1

| | Production method During application · curing | Battery element | | | Evaluation | |
|---|---|---|---|---|---|---|
| No. | Pressure ($P_0$) [MPa] | Electrode part First pressure ($P_1$) [MPa] | Resin part Second pressure ($P_2$) [MPa] | Pressure ratio ($P_2/P_1$) [–] | Resin part | Case |
| 1-1 | 10 | 1 | 0.12 | 0.12 | B[1] | A[2] |
| 1-2 | 1 | 1 | 0.95 | 0.95 | B | A |
| 1-3 | 0.05 | 1 | 1.5 | 1.5 | A | A |
| 1-4 | 0.04 | 1 | 4.8 | 4.8 | A | A |
| 1-5 | 0.03 | 1 | 18 | 18 | A | A |
| 1-6 | 0.01 | 1 | 38 | 38 | A | B |

[1] "B" indicates that breaks were detected.
[2] "A" indicates that no breaks were detected.

<<Results>>

As illustrated in Table 1 above, when the pressure ratio ($P_2/P_1$) is lower than 1.5, resin part 220 tends to break; when the pressure ratio ($P_2/P_1$) is higher than 18, case 100 tends to break; and when the pressure ratio ($P_2/P_1$) is from 1.5 to 18, breaks in both resin part 220 and case 100 tend to be reduced.

Second Experiment

In this second experiment, the correlation between the pressure during application and curing of the curable resin material ($P_0$) and the resistance of battery element 200 was investigated.

<<Producing Battery Element>>

(No. 2-1)

1. (a) Forming Electrode Part

Ten stacked units 215 were prepared. These ten stacked units 215 were stacked in a single, predetermined direction, and thereby electrode part 210 was formed. The solid electrolyte in the second experiment was $Li_7P_3S_{11}$.

2. (b) Applying Curable Resin Material

Between two frame plates 400, electrode part 210 was interposed. These two frame plates 400 were secured so that pressure ($P_0$) was applied to electrode part 210. In No. 2-1, pressure ($P_0$) was 0.01 MPa.

A curable resin material was prepared. The curable resin material in the second experiment was a UV-curable resin material. The curable resin material was applied to side face 213 of electrode part 210 while pressure ($P_0$) was being applied to electrode part 210. Thus, resin part 220 was formed.

3. (c) Curing

After resin part 220 was formed, the curable resin material was cured with a UV lamp while pressure ($P_0$) was being maintained. Thus, battery element 200 was produced.

(No. 2-2 to No. 2-8)

Battery element 200 was produced in the same manner as in No. 2-1 except that pressure ($P_0$) in "2. (b) Applying Curable Resin Material" and "3. (c) Curing" above was changed as specified in Table 2 below.

<<Evaluation>>

The resistance of battery element 200 was measured with an ohmmeter. Results are illustrated in Table 2 below.

TABLE 2

| No. | Production method During application · curing Pressure ($P_0$) [MPa] | Evaluation Battery element Resistance[1] [%] |
|---|---|---|
| 2-8 | 0 | 100 |
| 2-1 | 0.01 | 99.5 |
| 2-2 | 0.02 | 99.5 |
| 2-3 | 0.05 | 91 |
| 2-4 | 0.1 | 90 |
| 2-5 | 1 | 89 |
| 2-6 | 2 | 90 |
| 2-7 | 3 | 90 |

[1] The value under "Resistance" is a standardized value relative to the resistance in No. 2-8 defined as 100%.

<<Results>>

Figure 16:
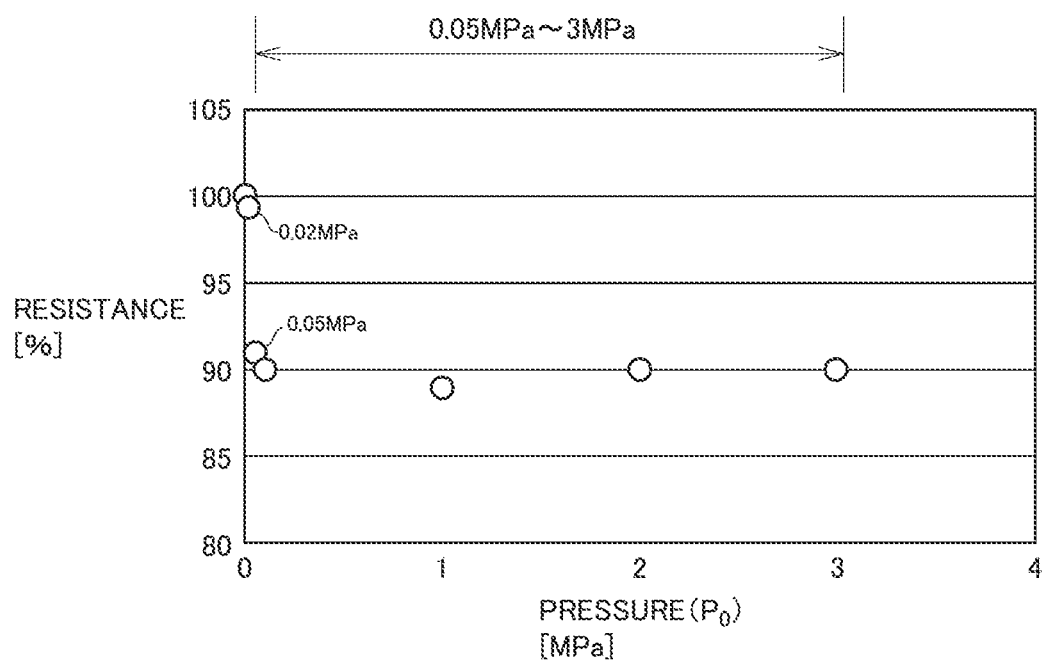
FIG. 16 is a graph illustrating the correlation between pressure ($P_0$) and resistance.

FIG. 16 is a graph illustrating the correlation between pressure ($P_0$) and resistance.

As illustrated in FIG. 16, as pressure ($P_0$) applied during application and curing of the curable resin material increases, the resistance of battery element 200 tends to be reduced.

In particular, when pressure ($P_0$) is within the range of 0.05 MPa to 3 MPa, the resistance of battery element 200 tends to be reduced.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. An all-solid-state battery comprising:
a case;
a battery element; and
a restraint component,
the case accommodating the battery element,
the battery element including an electrode part and a resin part,
the electrode part including one or more stacked units,
each of the stacked units including a positive electrode layer, a solid electrolyte layer, and a negative electrode layer,
the electrode part having a first main face, a second main face, and a side face,
the second main face being positioned opposite to the first main face,
the side face connecting the first main face and the second main face to each other,
the positive electrode layer, the solid electrolyte layer, and the negative electrode layer being stacked in a direction from the first main face toward the second main face,
the resin part including a resin cured product,
the resin part covering at least a part of the side face of the electrode part,
the restraint component being mounted outside the case,
the restraint component comprises a first restraint plate and a second restraint plate, both the first restraint plate and the second restraint plate are in physical contact with the case,
the restraint component applying pressure to the battery element through application of pressure to both sides of the battery element in the direction from the first main face toward the second main face,
the restraint component applying a first pressure to the electrode part, the first pressure is from 0.5 MPa to 50 MPa,
the restraint component applying a second pressure to the resin part,
a ratio of the second pressure to the first pressure being from 1.5 to 18.

2. The all-solid-state battery according to claim 1, wherein
the resin part includes at least one selected from the group consisting of a photocurable resin cured product and a thermocurable resin cured product.

3. The all-solid-state battery according to claim 1, wherein the case comprises a metal-laminated film.

4. The all-solid-state battery according to claim 3, wherein the metal laminated film comprises a first resin layer, a second resin layer, and a metal layer interposed between the first resin layer and the second resin layer.

5. The all-solid-state battery according to claim 4, wherein the first resin layer and the second resin layer comprise polyethylene, polyethylene terepththalate, or polyamide.

* * * * *